Aug. 4, 1931.  J. W. WHALEY  1,817,404
SLIP COVER FOR AUTOMOBILE SEATS
Filed March 11, 1930  3 Sheets-Sheet 1
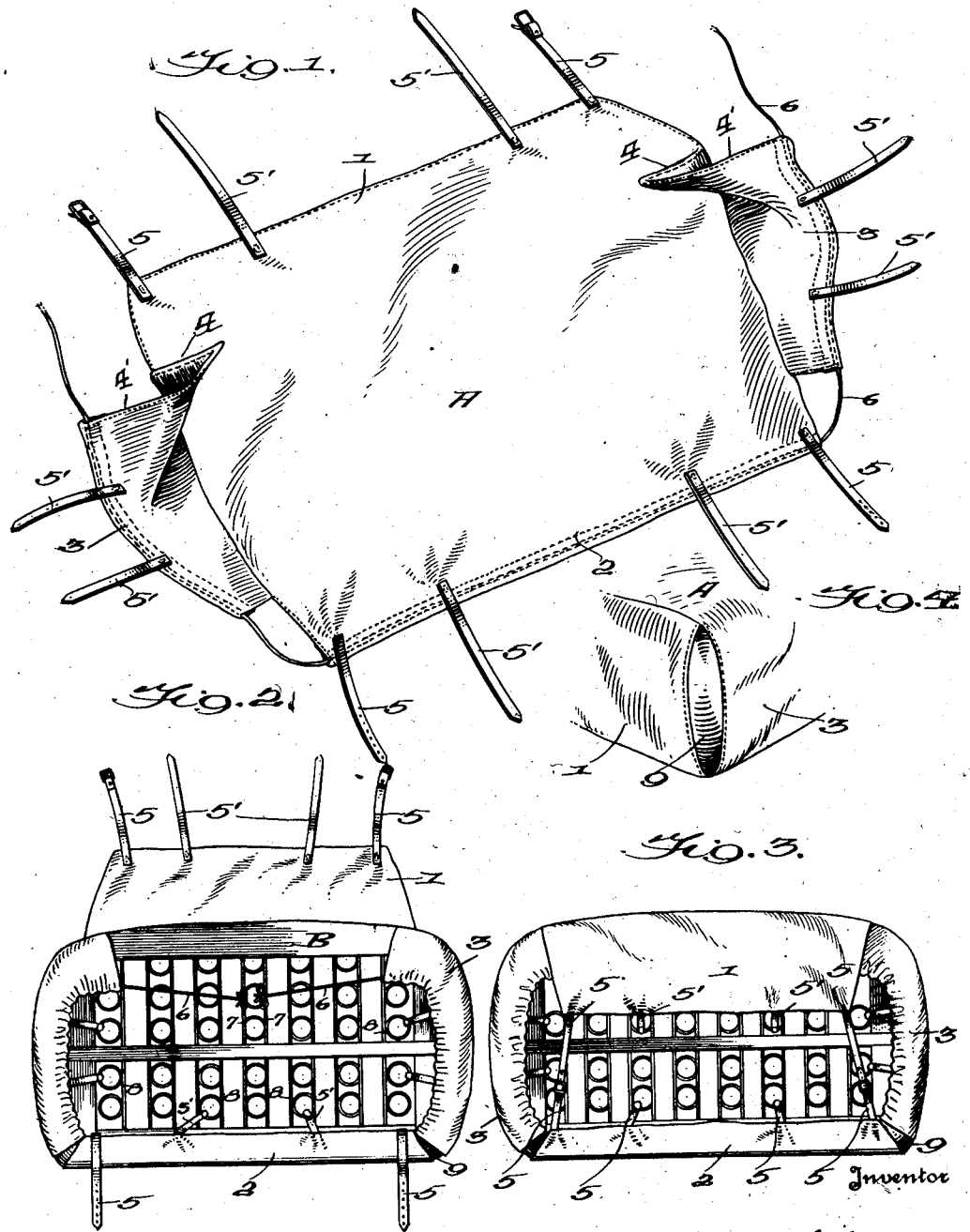
Inventor
John W. Whaley
By
Attorney Aug. 4, 1931.  J. W. WHALEY  1,817,404
SLIP COVER FOR AUTOMOBILE SEATS
Filed March 11, 1930   3 Sheets-Sheet 2
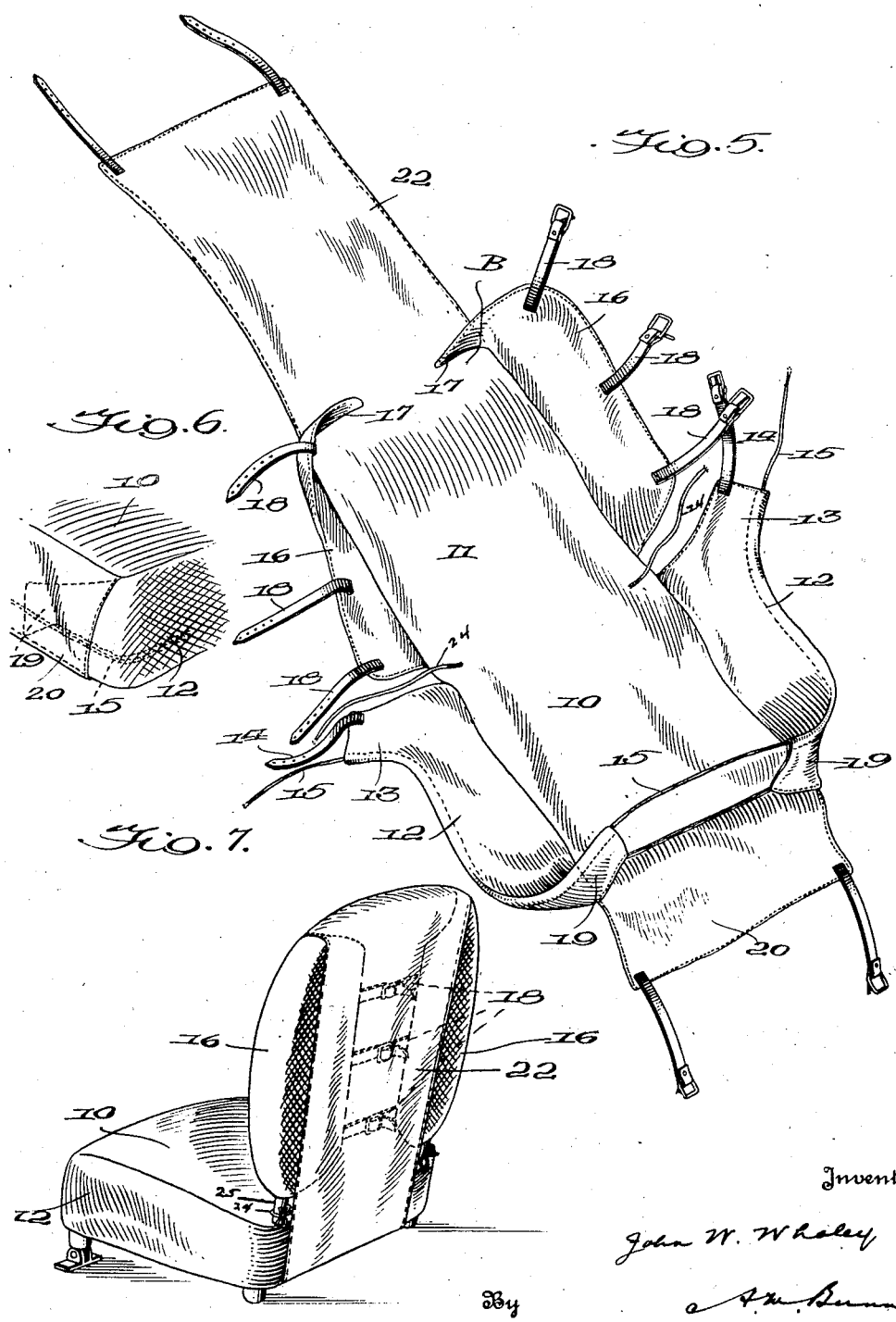

Aug. 4, 1931.    J. W. WHALEY    1,817,404
SLIP COVER FOR AUTOMOBILE SEATS
Filed March 11, 1930    3 Sheets-Sheet 3
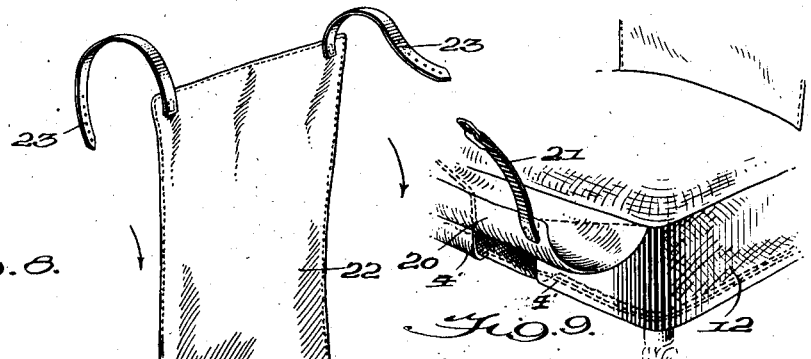
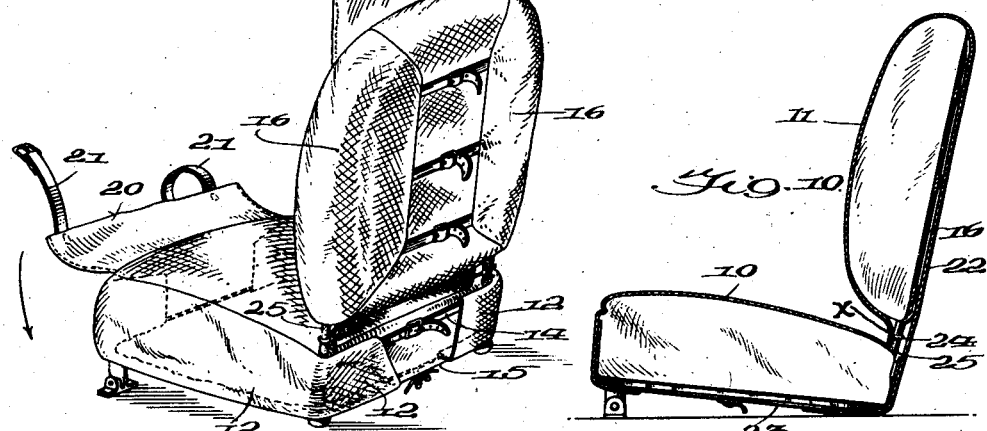
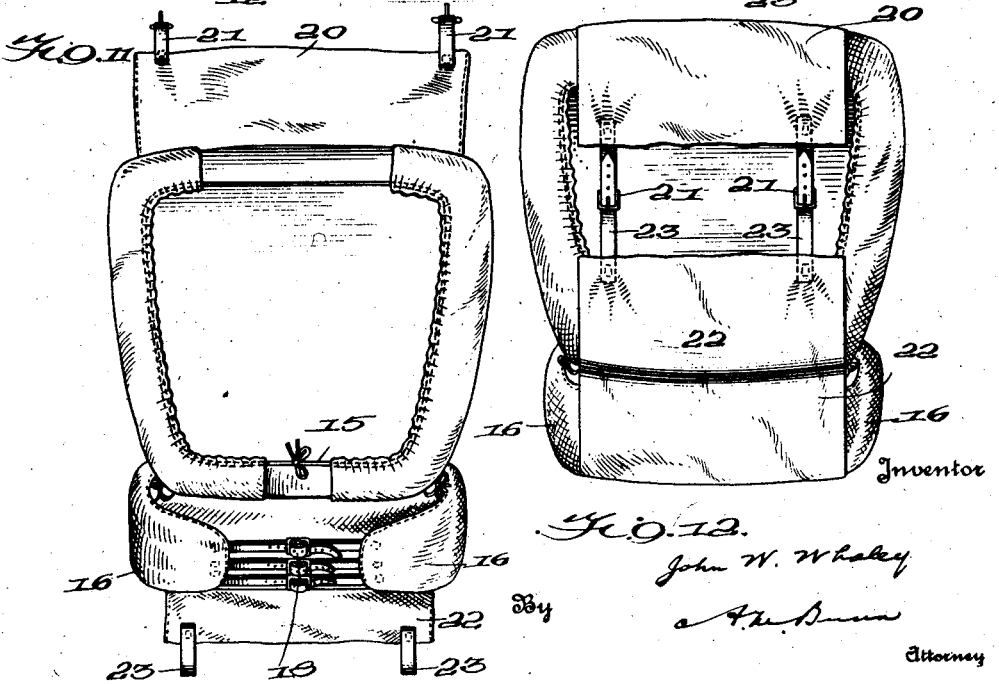

Patented Aug. 4, 1931

1,817,404

UNITED STATES PATENT OFFICE

JOHN W. WHALEY, OF RICHMOND, VIRGINIA

SLIP COVER FOR AUTOMOBILE SEATS

Application filed March 11, 1930. Serial No. 434,900.

This invention relates to slip covers for automobile seats, and more particularly to the provision of such a cover which may be economically fabricated, and easily applied to and removed from operative position.

The primary object of the invention is the provision of a cover provided with attaching means whereby it may be easily installed in unwrinkled condition to protect the seat.

Another object of the invention is the production of a seat cover which is adapted for adjustment to seats of various sizes.

Other objects of the invention will be made apparent in the following specification, when read in connection with the accompanying drawings forming a part thereof.

In said drawings:—

Fig. 1 is a perspective view showing the underside of a cover embodying my invention.

Fig. 2 is a front elevation of the bottom of an automobile seat, showing the cover partially secured in position.

Fig. 3 is a view similar to Fig. 2, with the cover fully secured in position.

Fig. 4 is a fragmentary perspective, showing one of the corners of the cushion.

Fig. 5 is a perspective view showing a combined seat-cushion and back-rest cover.

Fig. 6 is a fragmentary detailed perspective, showing a corner of a seat with the cover applied.

Fig. 7 is a perspective view showing the cover, illustrated in Fig. 5, applied to a seat of the coach type.

Fig. 8 is a perspective view showing the cover illustrated in Fig. 5, partially applied to a coach seat.

Fig. 9 is a fragmentary detail of one front corner of the seat, illustrating the method of covering the ends of the side flaps.

Fig. 10 is a sectional view taken vertically through the back rest and seat.

Fig. 11 is a perspective view showing the bottom of the seat cushion and back rest, with the cover partially applied in position, and, Fig. 12 is a similar view of the completely covered seat and back rest, as shown in Fig. 10.

Now referring specifically to the drawings, in which like reference numerals indicate like parts throughout the several views, A, in Fig. 1, indicates the under surface of a cover sheet for a seat cushion. Said sheet is formed substantially as herein illustrated being provided with an integral front flap 1, extending entirely across the sheet, with a rear flap 2, similarly formed on the rear edge of the sheet, and with a side flap 3 on each side of the sheet, the side flaps 3 being turned inwardly and laid upon the sheet A at 4, and stitched to the body of the sheet, for the purpose of causing the flap 3 to automatically extend downwardly adjacent the side edges of the seat, the edge 4', of the flap extending around the seat corner and lying on the front face of the seat, and adapted to be covered by the front flap 1, when the cover is in operative position, as shown in Fig. 3. All the flaps are provided, along their longitudinal edges, with a plurality of securing straps, tapes or cords 5, one end of which is secured to the fabric of the flap, the other end of certain of the straps, if desired, being fitted with means for connecting it to an opposite strap, or to a fixed support. The tapes or cords are flexible, and adapted to be tied in holding position as will later appear. In addition thereto, a cord 6 is slidably held within a hem formed in the outer margin of each of the flaps 3, and extending through a hem in the flap 2.

With the structure as just described, in the application of the cover sheet A to a seat B, Fig. 2, the surface of the sheet, here illustrated in Fig. 1, is laid on the top of the cushion of the seat B, Fig. 2, and the cords 6, 6 are then pulled tightly and tied to bars 7, forming a part of the spring-supporting framework of the inside of the cushion B. Obviously, the pull on the cords 6, 6, causes the side flaps 3, 3 to be drawn inwardly and puckered, as shown in Fig. 2, and the tapes 5', at each end of the cover sheet, are tied to the spring members 8, 8, on each side, as illustrated, the cover sheet being thereby drawn tight, and lying in unwrinkled condition longitudinally of the top of the seat. The rear flap 2 is then turned inwardly under the seat frame B, the tapes or cords 5, 5, being tightened and connected to the complementary tapes carried by the front flap 1, and the tapes 5' 5' being also tightened and tied to the proximate spring members 8, 8, as illustrated in Fig. 3.

It is to be noted that the operation just described stretches the fabric of the cover over the entire upper surface of the seat and causes it to lie in a substantially unwrinkled condition. It is also to be remembered that as here illustrated, the cover A is secured to spring members 8 at eight different points, a flexible connection being thereby obtained, not only minimizing the danger of rupture of the fabric of the cover, during the movements of the person using the seat, but also operating to retain the cover in its stretched condition at all times.

As herein illustrated it will be obvious that a cover sheet A of the character described, may easily be fabricated to dimensions adapted to fill all standard sized seats. If the seat illustrated in Fig. 3 were shorter, the flaps 3, 3, would merely extend inwardly to a greater extent, and the reverse would be true if the seat were longer. If the seat were wider than here illustrated the front flap 1 would not be extended so closely to the central line of the seat bottom, as here illustrated, the contrary of course being true, if the seat were narrower.

The rear corners 9 of the seat are here shown exposed, as in Fig. 4, but this is unobjectionable, since the rear of the seat is located underneath the padding of the back rest, and is not visible. The area of the exposed corner 9 is dependent upon the size of the cushion being covered.

Figs. 5 to 12, inclusive, illustrate a cover applicable to a seat of the coach type, and provides means for entirely covering the top and sides of the seat, and the front and rear of the back rest. The composite cover is illustrated best in Fig. 5, the portion 10 being laid upon the seat when the cover is being applied, and the connected portion 11 extending upwardly along the front of the back rest. Downwardly extending side flaps 12, 12 are formed integral with the seat portion 10, each terminating in a tongue 13, here shown as provided with a strap 14, at one corner, and with a cord 15 at the other corner, said cord running through a hem formed in the outer margin of the flap 12.

The upwardly extending portion 11 covers the front of the back rest as before stated, and carries integral, downwardly-directed side flaps 16, 16, the lower corners 17 of which are extended inwardly and stitched to the portion 11, as shown, the flaps 16, 16 being adapted to extend around the side edges of the back rest, and to engage the rear surface of the latter, as illustrated in Fig. 8, the straps 18, 18 being then inter-engaged to properly retain the flaps in position. The seat portion 10 being properly positioned, the flaps 12 are extended downwardly and lie in parallelism with each side of the seat, and extend around the rear corners thereof and lie upon the rear edge of the seat, as illustrated in Fig. 8, and the complementary strap members 14—14, and the cord 15—15, are adjusted to draw the flaps into tightened condition. The front of the seat portion 10 is provided, at each corner, with pocket flaps 19, 19, each being sewed at the bottom to the body of the portion 10, and being connected by the draw-cord 15. In practice, when the portion 10 is applied to the seat, the pocket flaps 19, 19 fit over the front corners thereof, and the cord 15 is pulled to bring them into tightened condition. The ends of the cord are then tied, to hold the flaps in place, as shown in Fig. 8. In this position the front flap 20, stitched to the portion 10, is folded downwardly to cover the ends 13, 13 of the side flaps 12, and is passed under the bottom of the seat, where its fastening straps 21, 21, are secured to the frame work, or otherwise.

After the front flap 20 has been properly positioned the portion 22, being an extension of the portion 11, is brought across the upper rim of the back rest and extended downwardly along the rear surface thereof, thereby covering the straps 18, 18, and the edges of the flaps 16, 16, the portion 22 being long enough to extend downwardly to a point beneath the seat, where the straps 23, 23 carried thereby may be secured to the frame work in the seat bottom, or connected to the rearwardly extending straps 21, 21, carried by the front flap 20. In applying this cover to seats such as illustrated in Fig. 7, straps or cords 24, 24, are carried by the cover and are operatively secured around the side rods 25, 25 of the seat. When so tightly secured, the rear edge of the cover portion 10, is drawn inwardly as best illustrated in Fig. 10, at x.

Modifications of the structures herein disclosed may be suggested to those skilled in the art, but my invention covers all embodiments falling fairly within the scope of the appended claims.

I claim:—

1. A cover for vehicle seat cushions and the like consisting of a body portion of flexible material for extending over and beyond the face of a seat cushion, and a flap portion connected to opposite sides of said body portion for extending over corresponding wall portions of the seat cushion, each flap having an end portion for engaging around corners and portions of the connecting wall between the aforesaid walls of the seat cushion, portions of said flap end portions extending inwardly of said body portion being secured to said body portion where they engage therewith along the line of said connecting wall and face of the cushion to provide with the corresponding body portion extending over said end flap portions a box-like structure, and means for securing said flaps and extending body portion to a seat cushion or the like.

2. A cover for vehicle seat cushions and the like consisting of a body portion of flexible material for extending over and beyond the face of a seat cushion, and a flap portion connected to opposite sides of said body portion for extending over corresponding wall portions of the seat cushion, each flap having an end portion for engaging around corners and portions of the connecting wall between the aforesaid wall of the seat cushion, portions of said flap end portions extending inwardly of said body portion being secured to said body portion where they engage therewith along the line of said connecting wall and face of the cushion to provide with the corresponding body portion extending over and covering the ends of said end flap portions a box-like structure, and adjustable means connecting the flap portions adapting the cover for receiving seat cushions and the like which may vary in size.

3. A cover for vehicle seats comprising a sheet of flexible material having a body adapted to extend over and forwardly of the seat, a flap connected to each side of the body, a portion of each flap adjacent an end thereof extending inwardly beneath said body and being secured thereto by a line of stitching parallel to the front edge of the seat to provide with said forwardly extending portion of the body portion a box-like structure for receiving the front end of the seat, a drawstring connecting the flaps to draw said flaps around the seat whereby the cover may be secured over seats which may vary in size, and means for securing said forwardly extending portion of the body portion to the seat in position to cover the ends of said inwardly extending flap portions.

In testimony whereof I hereunto affix my signature.

JOHN W. WHALEY.